United States Patent
Touzni et al.

(10) Patent No.: US 8,212,944 B2
(45) Date of Patent: Jul. 3, 2012

(54) FAST STREAM SWITCHING

(75) Inventors: Azzedine Touzni, Algonquin, IL (US); Yunjun Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 687 days.

(21) Appl. No.: 12/240,475

(22) Filed: Sep. 29, 2008

(65) Prior Publication Data

US 2010/0007802 A1 Jan. 14, 2010

Related U.S. Application Data

(63) Continuation-in-part of application No. 12/170,491, filed on Jul. 10, 2008, now Pat. No. 8,094,643.

(51) Int. Cl.
*H04N 5/50* (2006.01)

(52) U.S. Cl. ........................................................ 348/731

(58) Field of Classification Search .................. 348/725, 348/705, 706, 552, 553, 731, 730, 732; 725/131, 725/139, 104, 39, 100; 370/487, 395.4, 347
See application file for complete search history.

(56) References Cited

U.S. PATENT DOCUMENTS

| | | | |
|---|---|---|---|
| 6,061,405 A | 5/2000 | Emami | |
| 6,493,331 B1 | 12/2002 | Walton et al. | |
| 6,560,463 B1 * | 5/2003 | Santhoff | 455/522 |
| 7,240,223 B2 * | 7/2007 | de Cesare et al. | 713/300 |
| 7,286,609 B2 | 10/2007 | Maltsev et al. | |
| 7,539,518 B2 * | 5/2009 | Kanno | 455/574 |
| 7,570,953 B2 | 8/2009 | Maltsev et al. | |
| 7,583,977 B2 | 9/2009 | Willenegger et al. | |
| 7,716,704 B2 * | 5/2010 | Wang et al. | 725/46 |
| 7,929,059 B2 * | 4/2011 | Watson et al. | 348/725 |
| 7,950,042 B2 * | 5/2011 | Yousef | 725/131 |
| 2005/0058151 A1 | 3/2005 | Yeh | |
| 2006/0120378 A1 * | 6/2006 | Usuki et al. | 370/395.4 |
| 2006/0225109 A1 * | 10/2006 | Seo | 725/100 |
| 2007/0110105 A1 * | 5/2007 | Usuki et al. | 370/487 |
| 2007/0188665 A1 | 8/2007 | Watson et al. | |
| 2007/0247936 A1 * | 10/2007 | Direnzo et al. | 365/200 |
| 2008/0209474 A1 * | 8/2008 | Pjanovic et al. | 725/46 |
| 2008/0216116 A1 * | 9/2008 | Pekonen et al. | 725/39 |

(Continued)

FOREIGN PATENT DOCUMENTS

EP 1684450 A2 7/2006

OTHER PUBLICATIONS

DVB, Digital Video Broadcasting, DVB-H Implementation Guidelines, TM 2977 Rev. 9, Draft TR 102 377, V1.2.2, ETSI, 17A Ancienne Route 1218 Grand Saconnex, Geneva Switzerland, Jan. 31, 2006, XP040408488, paragraph [04.3], paragraph [05.3], paragraph [8.5.2], paragraph [8.6.1]—paragraph [8.6.3].

(Continued)

*Primary Examiner* — Paulos Natnael
(74) *Attorney, Agent, or Firm* — Kevin T. Cheatham (57) ABSTRACT

A method of fast stream switching including receiving at least one first stream at a device corresponding to at least one first program, wherein the device employs dynamic power management and is operating at a first power level; activating a selection panel; receiving a plurality of streams corresponding to a plurality of programs; and adjusting to a second power level. After a stream is selected, the non-selected streams may be deactivated and the device may return to the first power level.

34 Claims, 8 Drawing Sheets

U.S. PATENT DOCUMENTS

| | | | |
|---|---|---|---|
| 2008/0316950 A1 | 12/2008 | Damnjanovic | |
| 2009/0031374 A1* | 1/2009 | Choi | 725/104 |
| 2009/0106571 A1* | 4/2009 | Low et al. | 713/310 |
| 2009/0168902 A1* | 7/2009 | Kisoda et al. | 375/240.27 |
| 2009/0241163 A1* | 9/2009 | Seo | 725/139 |
| 2009/0323829 A1 | 12/2009 | Riveiro et al. | |
| 2010/0008349 A1 | 1/2010 | Zhang et al. | |
| 2010/0027726 A1* | 2/2010 | Lin | 375/346 |
| 2010/0033580 A1* | 2/2010 | Shaffer et al. | 348/192 |
| 2010/0172279 A1 | 7/2010 | Chen et al. | |
| 2010/0316024 A1 | 12/2010 | Kiran et al. | |

OTHER PUBLICATIONS

International Preliminary Report on Patentability—PCT/US2009/058078, The International Bureau of WIPO—Geneva, Switzerland, Jan. 31, 2010.

International Search Report Written Opinion—PCT/US2009/058078, International Search Authority—European Patent Office—Feb. 4, 2010.

European Telecommunications Standards Instutite, "Digital Video Broadcasting (DVB); DVB-H Implementation Guidelines", ETSI TR 102 377, V1.2.1, (Nov. 2005).

* cited by examiner

FAST STREAM SWITCHING

CROSS REFERENCE TO RELATED APPLICATIONS

This application is a continuation in part and claims the benefit of U.S. patent application Ser. No. 12/170,491, filed Jul. 10, 2008, which is incorporated by reference as if fully set forth.

FIELD OF INVENTION

This application is related to broadcast systems.

BACKGROUND

In television systems, the ability to view a channel guide or menu is a popular feature. The channel guide allows a user to review program titles and content before selecting a channel. In analog television systems, a channel was dedicated as a television guide channel that would list the contents of each channel, but was not interactive. However, in digital systems, users are presented with an interactive television guide which is dynamically updated, and allows a user to review additional programming information (such as program descriptions etc.), and switch between channels. The interactive television guide receives signals from all the channels and generates a channel list including the programming information. However, this typically requires increased bandwidth and high power consumption when placed in a mobile device.

Because battery life is an important feature in mobile devices, power management is utilized to minimize the power consumption of the overall system, which can extend battery life and prevent overheating.

For example, DVB-H implements multiprotocol encapsulation (MPE), MPE forward error correction (MPE-FEC), and time slicing as a part of its power management scheme for mobile devices.

Time slicing comprises the transmission of data traffic in bursts followed by periods of no transmissions. The burst transmissions are referred to as time slices. In order to reduce the power consumption of the DVB-H handset, the DVB-H handset can shut down the receiver for the duration between the time slices.

In a typical DVB-H communication, multiple input streams are received by different sources as individual elementary streams. The input streams are multiplexed according to a selected time slicing method. MPE-FEC coding, which provides an additional layer of error correction, is performed separately for each individual elementary stream. The system then performs MPE encapsulation of the data packets and embeds them into a transport stream.

In addition to receiving single stream transmissions, the DVB-H Guidelines also support the reception of multiple elementary streams embedded in the same burst as well as multiple services embedded in the single elementary stream. There are three scenarios for transmitting multiple element streams in DVB-H, as described further below. To illustrate the design of multiple stream power management, an example using two element streams, is shown for all three scenarios.

Figure 1:
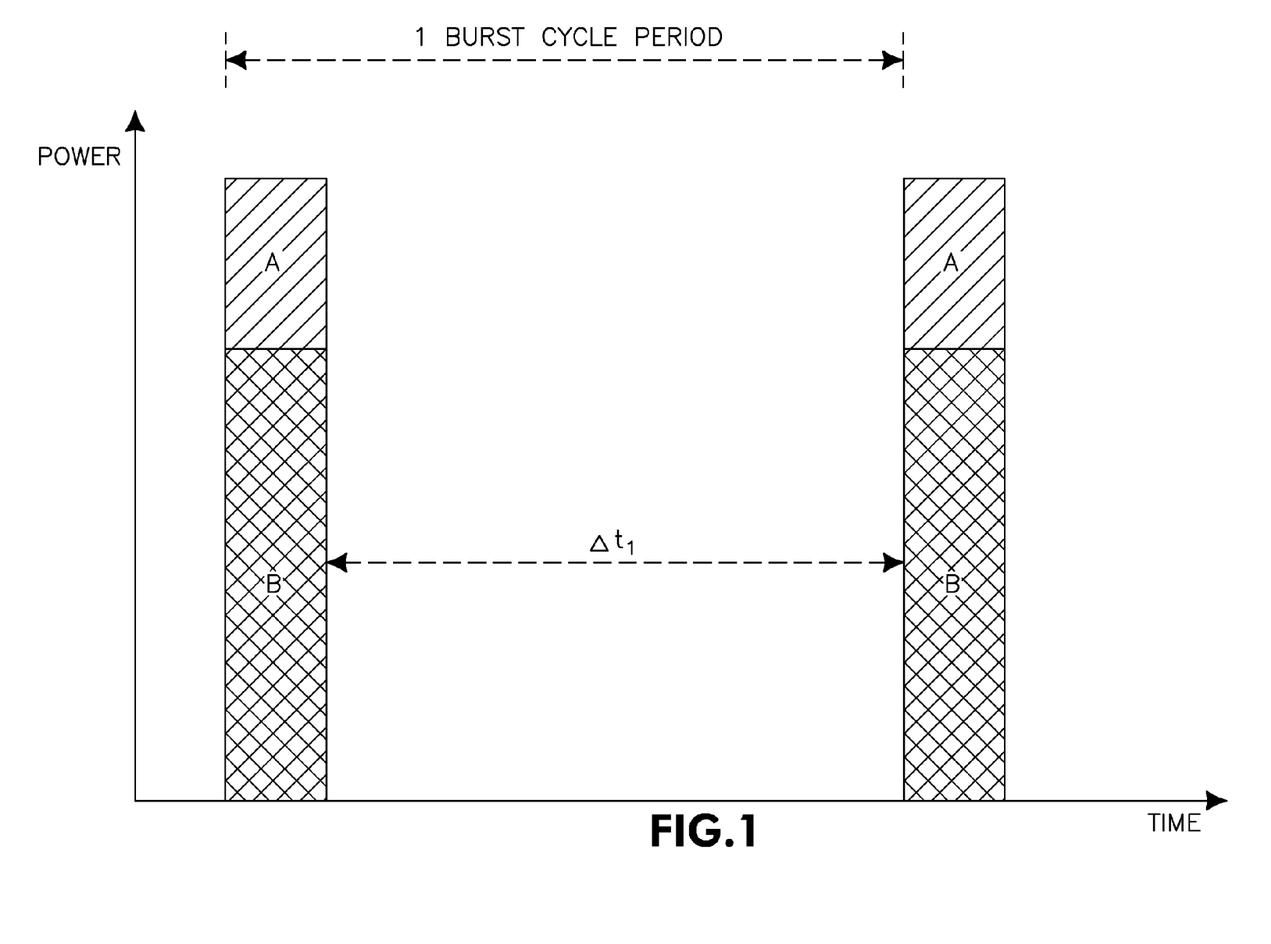
FIG. 1 is a graph showing the power management of a DVB-H handset receiving multiple channels are transmitted on concurrent streams.

FIG. 1 is a graph showing the power management of a DVB-H handset receiving multiple channels transmitted on concurrent streams.

Figure 2:
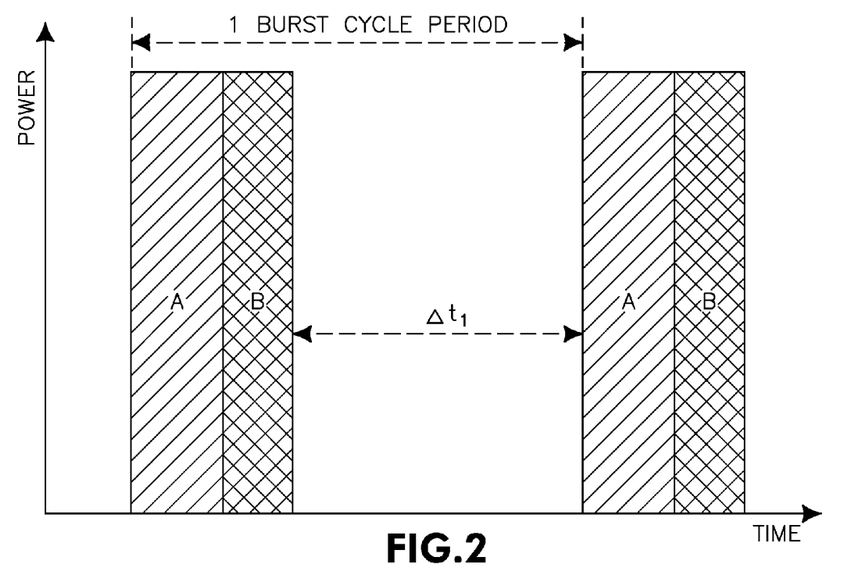
FIG. 2 is a graph showing the power management of a DVB-H handset receiving multiple channels where the services are located on contiguous streams.

FIG. 2 is a graph showing the power management of a DVB-H handset receiving multiple channels where the services are located on contiguous streams.

Figure 3:
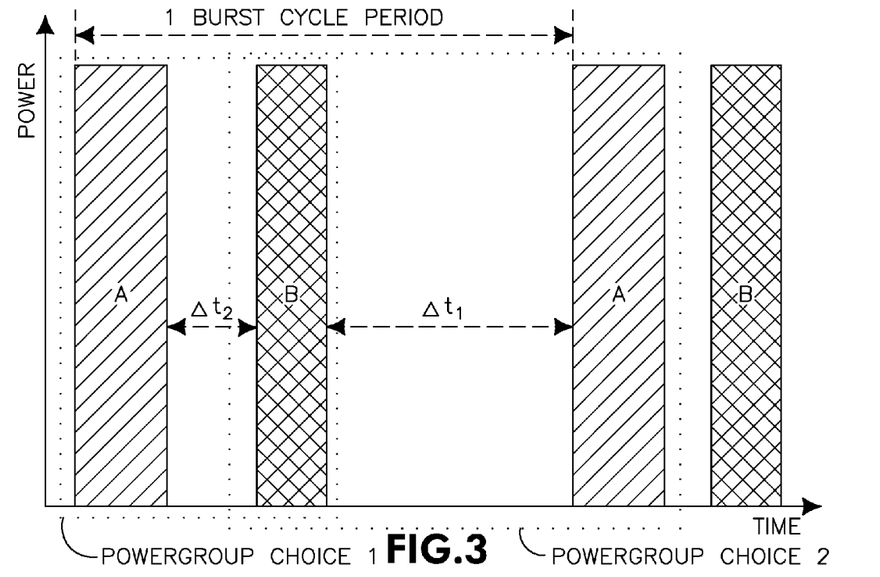
FIG. 3 is a graph showing the power management of a DVB-H handset receiving multiple channels where the services are located on isolated streams.

FIG. 3 is a graph showing the power management of a DVB-H handset receiving multiple channels where the services are located on isolated streams.

A method for fast stream switching for the multi-stream and single stream applications using dynamic power management is desired.

SUMMARY

A method of fast stream switching is disclosed. In order to reduce power consumption during the fast stream switching, the method may include receiving at least one first stream at a device corresponding to at least one first program, wherein the device employs dynamic power management and is operating at a first power level; activating a selection panel; receiving a plurality of streams corresponding to a plurality of programs; and adjusting to a second power level. After a stream is selected, the non-selected streams may be deactivated and the device may return to the first power level.

BRIEF DESCRIPTION OF THE DRAWINGS

A more detailed understanding may be had from the following description, given by way of example in conjunction with the accompanying drawings wherein.

DETAILED DESCRIPTION

In the case where a device is capable of receiving multiple streams, a fast stream switch scheme may be important for viewers. Fast stream switching is a method of rapid channel switching that is accomplished without having to make receiver-side changes, including starting a new stream with the transmitter. In order to perform such operations in a mobile device, the mobile device may receive multiple streams, which would be decoded and processed to generate the TV selection panel. However, receiving and decoding multiple streams requires high levels of power consumption, which is extremely undesirable for mobile devices.

Figure 4:
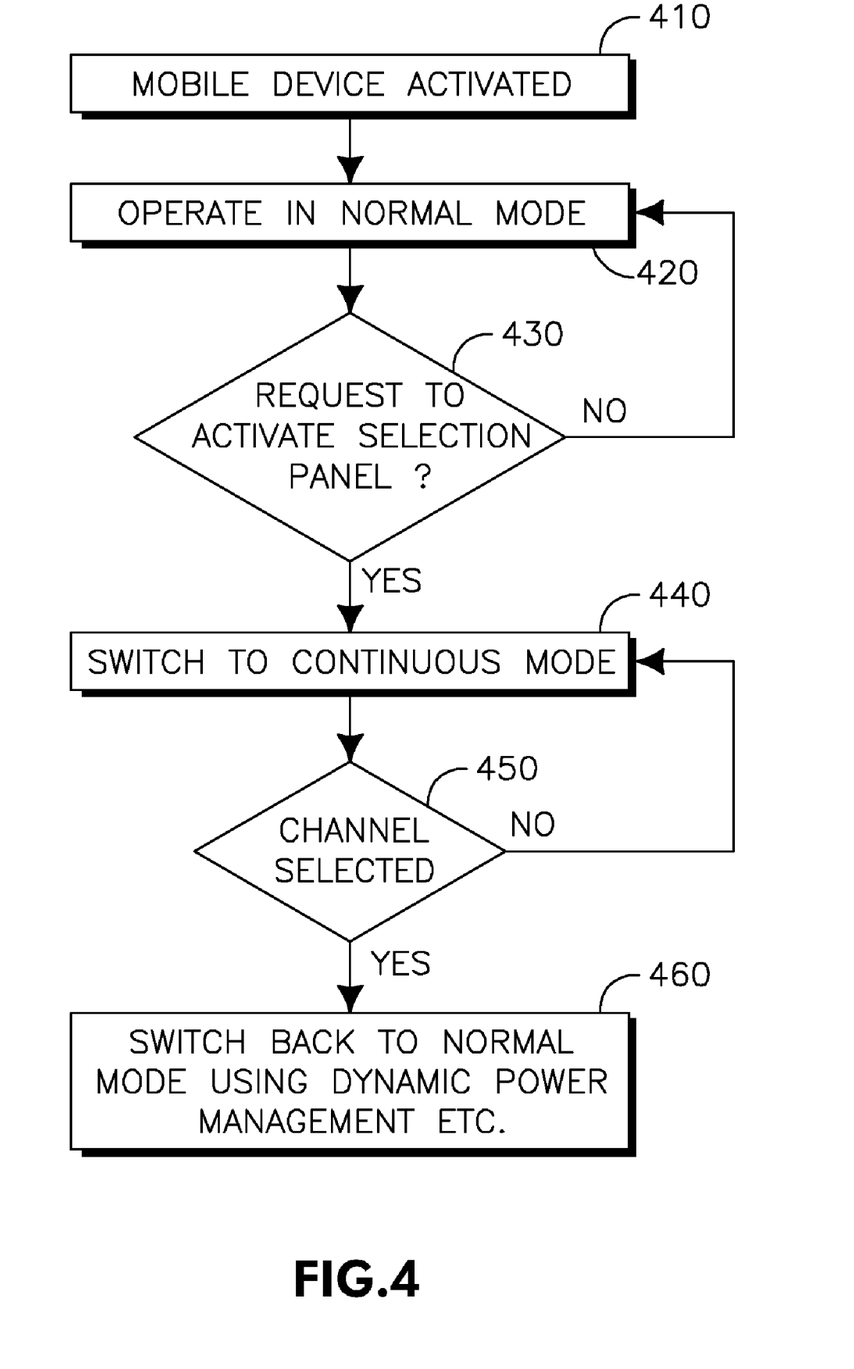
FIG. 4 is a flow diagram showing an example of dynamic power control to be used with fast stream switching.

FIG. 4 is a flow diagram of a method of dynamic power control using fast stream switching. A user activates the mobile device (410). The mobile device operates in a normal viewing mode, (i.e. less than the maximum number of streams is received) where one channel is viewed, (or multiple channels if a picture-in-picture feature is activated). While operating in the normal mode, the mobile device operates using dynamic power management to reduce power consumption (420). In other words, dynamic power management uses time slicing and scheduling to power down selected components of the mobile device, as will be described in further detail hereafter. The mobile device operates at the low power mode until a request to activate the selection panel, (i.e., menu), is received (430). The mobile device activates the selection panel in order to perform fast stream switching (440). Once the user activates the selection panel, the dynamic power management switches to a continuous mode, (all time power on), and receives the maximum number of video streams (TV channels) that can be supported by the mobile device (450).

While the selection panel is active, the mobile device operates in the continuous mode, meaning all of the components in the receiver may be powered on. After a channel, (and thereby the corresponding stream), is selected, all of the unselected streams are deactivated (460). The dynamic power management re-groups the selected streams according to the multi-stream dynamic power management scheme presented in U.S. patent application Ser. No. 12/170,491. After the re-grouping is completed, dynamic power management will activate time-slicing if a meaningful power saving can be achieved. As an alternative, for a mobile device operating in a single stream mode, the mobile device switches to the selected channel and then activates time slicing. Otherwise, the dynamic power management will keep a mobile device operating in the continuous mode, until either the user selects a new channel or the current session ends.

Figure 5:
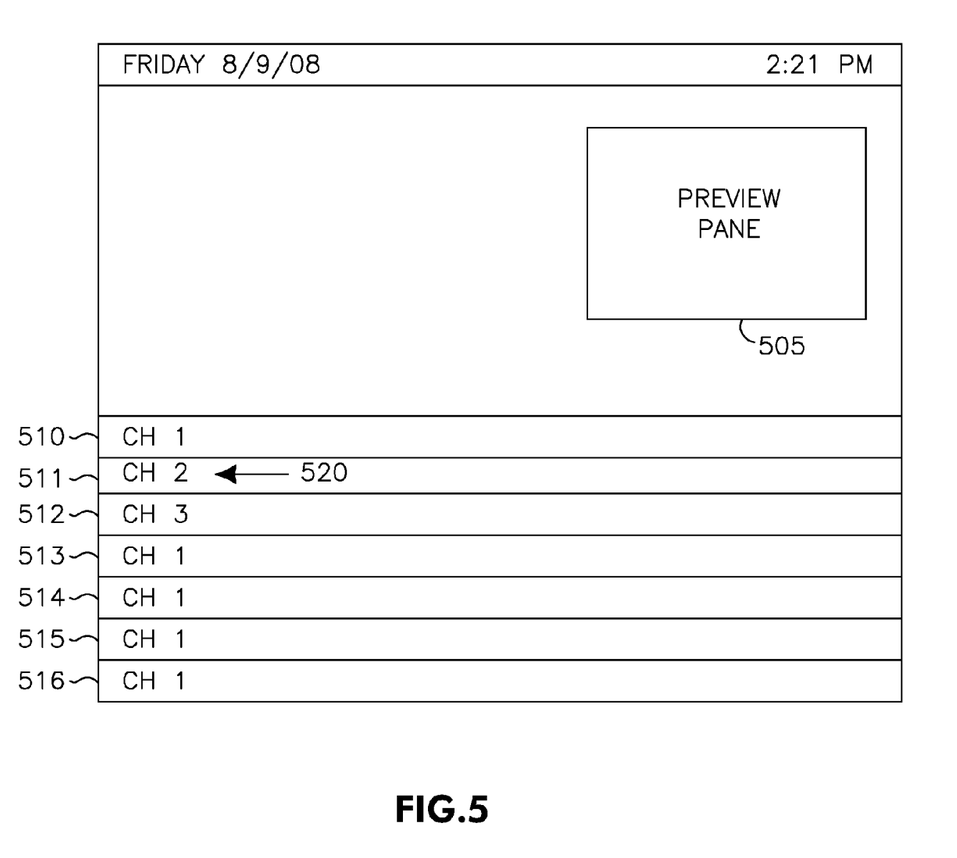
FIG. 5 is an example of a TV selection panel.

FIG. 5 is an example of a selection panel 500. The fast stream switching may be controlled by the selection panel 500 that appears to the user on the display. The selection panel comprises a preview pane 505, a plurality of channels which are graphically illustrated as (CH1-CH7) 510-516 although one of skill in the art would realize that any number of channels may be implemented, and a cursor 520. The selection panel 500 may be controlled by a user operated control or any other input device. The preview pane 505 displays a smaller version of a channel highlighted by the cursor 520; a user may view the preview pane 505 while perusing options in the selection panel 500. The cursor is used to highlight a selected channel in the selection panel 500. The selection panel 500 may be configured such that the choice of channels presented to a user is different the first time a user watches a TV program from when a user changes channels while already watching a program. The first time a user activates the selection panel 500, the mobile device processes all of the streams in a pre-stored TV channel list. In one embodiment, the pre-stored channel list can be determined based on the general popularity among other users. After the first use, the user may generate a customer built preferred TV channel list by the customer selecting channels and manually storing them in the preferred TV channel list. If there is no customer built preferred TV channel list, after a certain period of time, (e.g. several weeks or even months), the mobile device may generate an individualized TV channel list based on this specific user's watching habit, and this list becomes the default list unless user selects the pre-stored list or generates a customer built preferred TV channel list. The TV channel list which is used by default is termed as the preference list.

Figure 6:
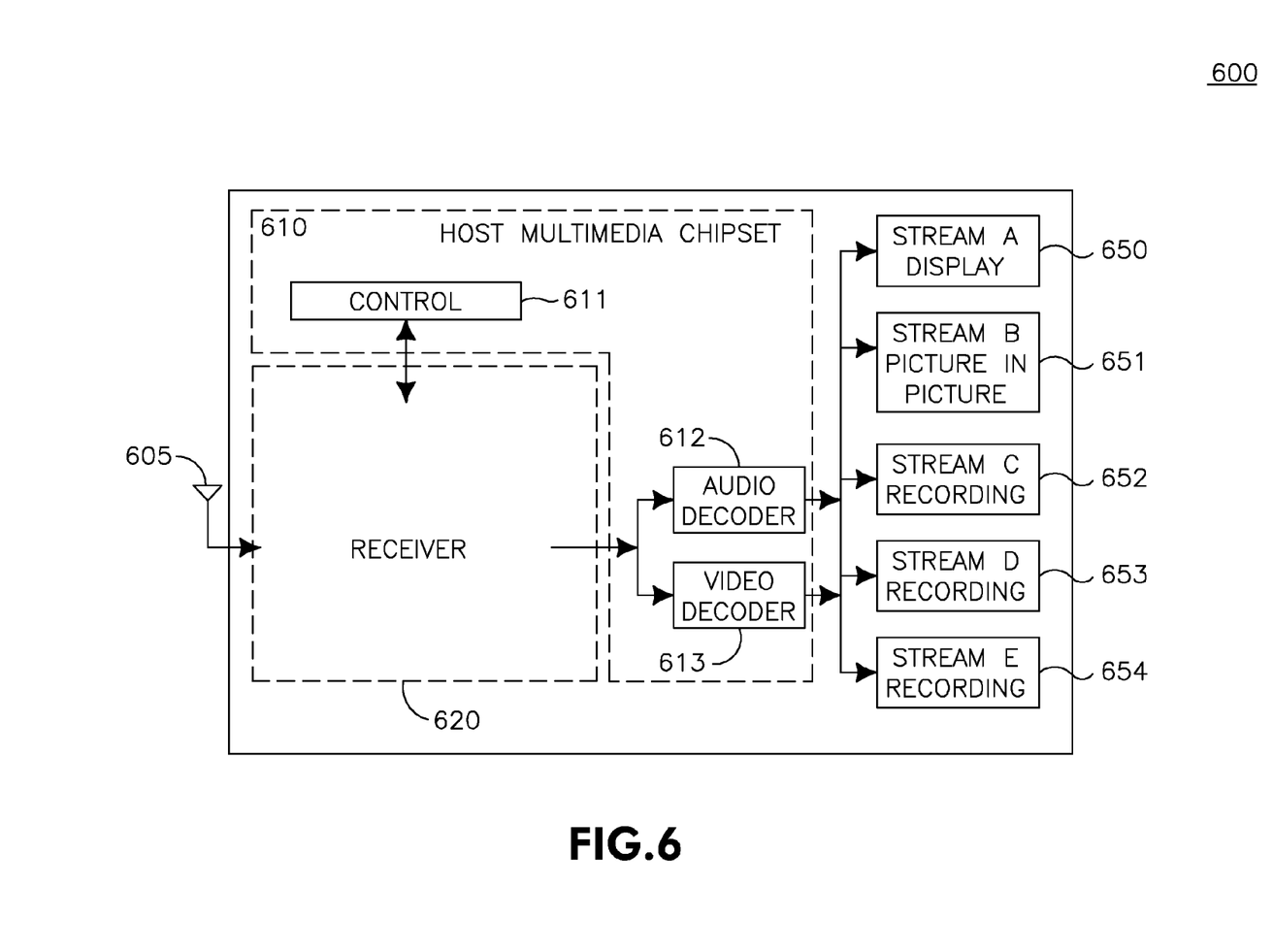
FIG. 6 is a block diagram of a multiple stream mobile device 600.

FIG. 6 is a block diagram of a multiple stream mobile device 600. The mobile device 600 includes an antenna 605, a host multimedia chipset 610 and a receiver 620 and five streams corresponding to five separate services 650-654. Although five streams are shown, one of skill in the art would realize that any number of streams may be implemented. The host multimedia chipset 610 includes a control module 611, and audio decoder 612 and a video decoder 613. The mobile device 600 is configured to support multiple services to each user including a primary display, a secondary display for picture-in-picture, and multiple streams for simultaneous recording. Each is configured to perform a method for fast stream switching. In addition to fast stream switching, all the components may be configured to perform dynamic power management as disclosed in U.S. patent application Ser. No. 12/170,491 which is incorporated by reference herein.

Figure 7:
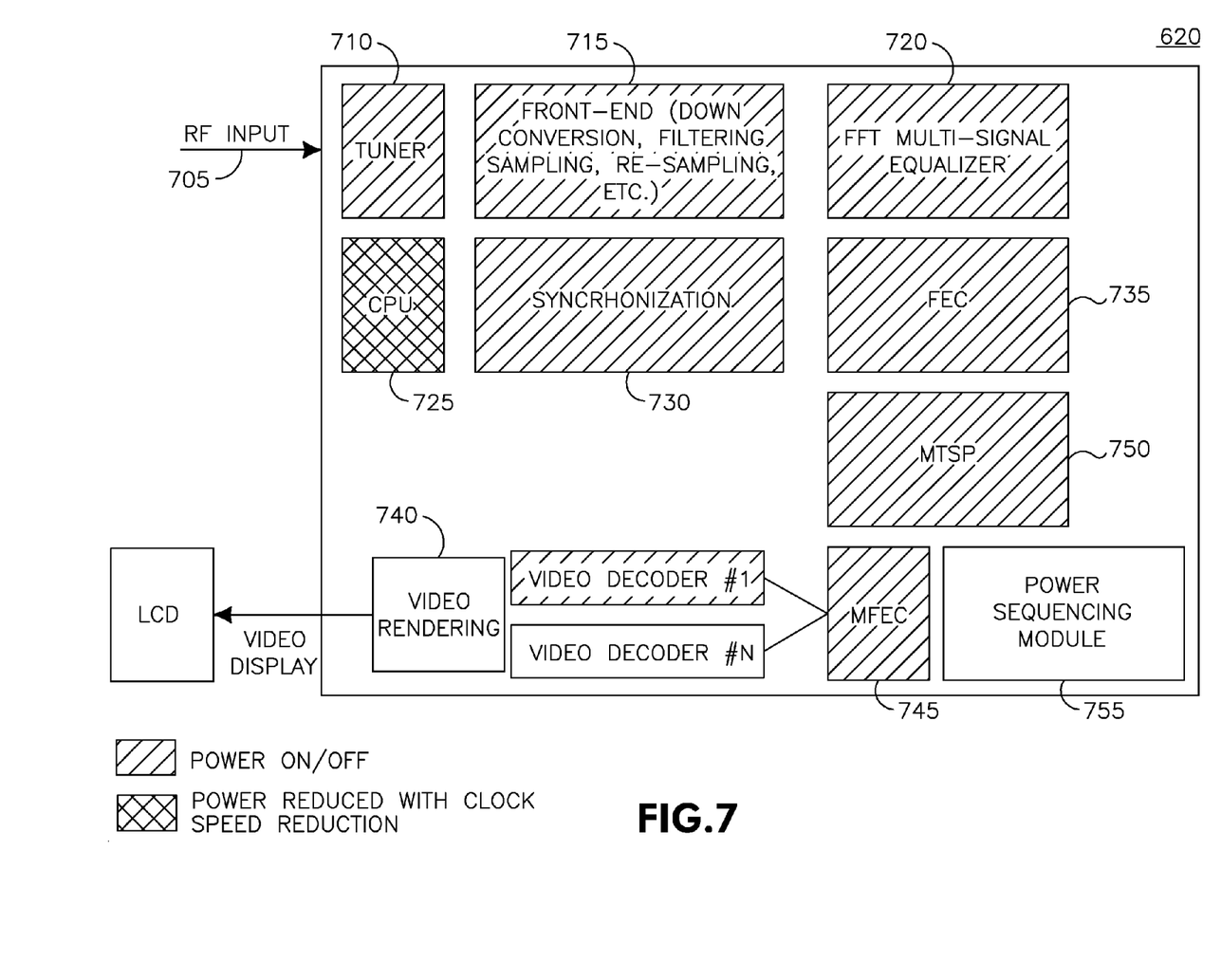
FIG. 7 is a block diagram of the receiver 620 of FIG. 6.

FIG. 7 is a block diagram of the receiver 620 of FIG. 6. The receiver 620 comprises an RF input 705, a tuner 710, a front end block 715, a fast Fourier transform (FFT) multi-signal equalizer 720, a central processing unit (CPU) 725, a synchronization block 730, a forward error correction (FEC) block 735, a video rendering block 740, an MFEC 745 including multiple video decoders, and a multi-stream transport processor (MTSP) 750 and a power sequencing module 755. The receiver 620 is configured to perform a method for fast stream switching and dynamic power management.

The MFEC 745 is configured to correct detected errors in the IP datagram and to anticipate the number of streams that can be played by the mobile device 600 simultaneously. Once the MFEC 745 has determined the number of streams, it may then determine the on and off times of the individual components. The MFEC 745 may signal the on and off times to the MTSP 750.

The MTSP 750 may process multiple streams in each burst cycle period. The MTSP 750 may separate the multiple streams into individual parts and transmit them to a buffer or MFEC 745. The MTSP 750 may receive the on and off times of the various components and power down and power up the various components of the DVB-H receiver. In one embodiment, the MTSP 750 may be configured to perform power-grouping. In order to determine the powergrouping, several factors including the time interval of the burst, the minimum power saving, and the burst cycle period must be considered. This is only one example of powergrouping, other factors may also be considered.

Alternatively, the power sequencing module 755 may be configured to perform the power management of the mobile device. In one embodiment, the power sequencing module may be configured to power down and power up the tuner 710, the front-end block 715, the FFT, the synchronization block 730, the FEC block 735, the MTSP 750 and the MFEC 745 depending on the dynamic power management conversions. While the CPU 725 is typically always on, in a reduced power state, the CPU 725 power may be reduced with clock speed reduction. The power sequencing module 755 may perform the power management in conjunction with the MTSP 750 and MFEC 745 or as a standalone unit.

The front end block 715 is configured to perform the front end processing implemented on the mobile device 600 including frequency offset correction, filtering, frequency offset estimation, and guard interval removal.

The fast Fourier transform (FFT) multi-signal equalizer 720 is configured to receive a time-domain signal, compute the discrete Fourier transform (DFT) of the time-domain signal and transform it into a frequency-domain signal.

The synchronization block 730 generates a channel estimate by estimating the noise power based on an inserted pilot signal or the TPS signals.

The FEC block 735 provides forward error correction decoding of the signal.

The video rendering block 740 decodes the received video signals to render a video image.

The CPU 725 is configured to control of the RF Input/Output. The CPU 725 may also be configured to perform data signal processing features for video improvement, graphic processing, audio decoding, etc. The CPU 725 may also be referred to as a baseband processor because its primary function is to integrate the demodulation/modulation function for the voice data transfer.

In case of a Multi-Frequency Network (MFN), if the mobile device 600 cannot not support all the TV channels in the list, (because they are spread out on different radio frequencies), the mobile device 600 may be configured to prioritize the transmissions. For example, the mobile device 600 may grant a higher priority to the radio frequency which caries the most of the TV programs in the preference list or it may give a higher priority to the radio frequency carries the most watched TV channels.

In addition to the switching scheme based on the preference list, two or three TV channel processing capability may be reserved to the channels where the cursor is nearest to their icons or channel names on the selection panel 500. In other words, the active stream list is changed continuously, though some of them may be unchanged, until the final list of streams is determined by user's choice.

Figure 8A:
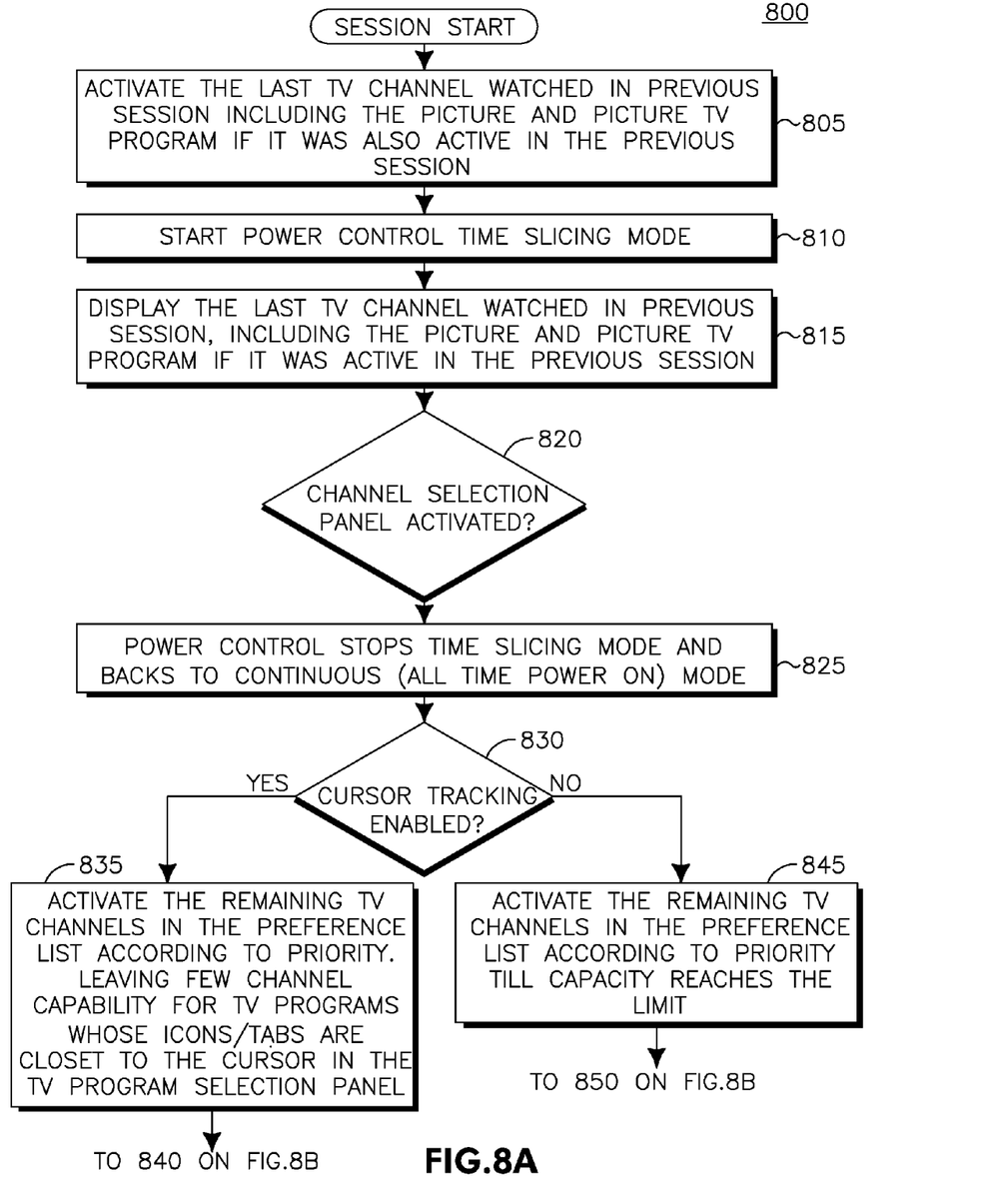
FIGS. 8A and 8B are a top level block diagram of a process for fast stream switching implemented in a DVB-H system.
Figure 8B:
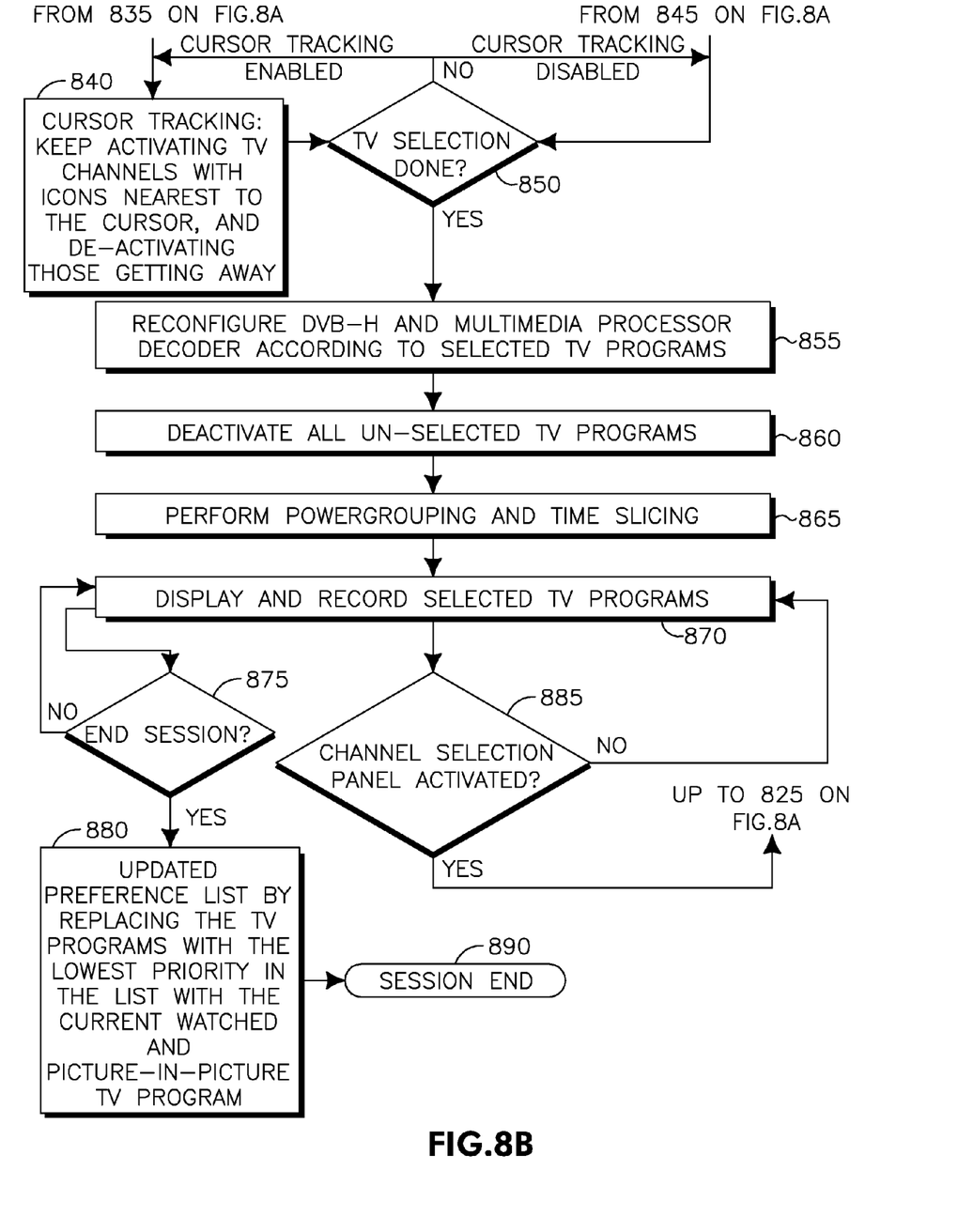

FIGS. 8A and 8B show a top level block diagram of a process for fast stream switching implemented in a DVB-H system. A user initiates a session by activating the DVB-H tuner. The last TV channel that was watched in a previous session is activated, this may include multiple channels if a picture-in-picture feature was active previously (805). The receiver then starts the dynamic power management time slicing mode (810). The last TV channel watched in the previous session is then displayed (815). The last TV channel is displayed until the channel selection panel is activated (820).

If the channel selection panel is activated, the time slicing mode is stopped and the receiver returns to continuous (all time power on) mode (825). The receiver will continue operating on continuous mode until cursor tracking is enabled (830). If cursor tracking is enabled, the rest of the TV channels in the preference list are activated according to priority (835). A few channels may be left open for TV channels whose icons are closest to the cursor in the selection panel. As long as cursor tracking is enabled, as the cursor moves, the TV channels whose icons/tabs are closest to the cursor are activated and the channels with icons that are getting further away are deactivated (840). If cursor tracking is not enabled, then all the rest of the TV channels in the preference list are activated according to priority until a maximum number of channels are activated (845). Alternatively, if the maximum processing capability of receiver 620 and host multimedia chipset 610 is not reached, those inactive streams in the preference list may be added to service according to their priority in the list. In a single stream case, if the stream being viewed is in the preference list, all the rest of the streams will be activated. In case the stream being viewed is not in the preference list, the TV channel with lowest priority in the preference list will be kept inactive, but all of the rest will be activated. Another approach is to randomly choose one stream from the preference list, keep it inactive and add activate all the rest in the list The preference list remains activated until TV channel selection is completed (850). After channel selection is completed, the DVB-H multimedia processor decoder may be reconfigured according to the selected TV channels (855). The unselected TV channels are deactivated (860). Powergrouping and time slicing may be performed (865). The device may display and record the selected TV channels (870). If the session is ended (e.g. by timer, or user selection, or a power down procedure (875), the preference list may be updated by replacing the TV channels with the lowest priority in the list with the current watched channel (880). The session may then end (890). Alternatively, if the channel selection panel is reactivated, the previous steps may be repeated (885).

While the examples above are shown for use in a DVB-H system, they may also be used in other broadcasting networks. Examples of broadcasting networks includes second generation Digital Video Broadcasting-Terrestrial (DVB-T2) Digital Video Broadcasting-Terrestrial/handheld (DVB-T/H), Integrated Services Digital Broadcasting (ISDB)-T, Digital Audio Broadcasting-Terrestrial (DAB-T), Terrestrial-Digital Multimedia Broadcasting (T-DMB), Digital Multimedia Broadcasting-terrestrial/handheld (DMB-TH), and Media-FLO.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAS) circuits, any other type of integrated circuit (IC), and/or a state machine.

What is claimed is:

1. A method of fast stream switching, the method comprising:
   receiving at least one first stream at a device corresponding to at least one first program, wherein the device employs dynamic power management and is operating at a first power level;
   activating a selection panel that graphically illustrates a plurality of channels, the selection panel comprising a cursor;
   while the selection panel is active, receiving a plurality of streams corresponding to the plurality of channels;
   while the selection panel is active, operating in a second power level, wherein the second power level is a higher power level than the first power level in order to receive the plurality of streams;
   as the cursor moves, activating ones of the channels with icons in the selection panel that are closer to the cursor and deactivating ones of the channels with icons in the selection panel that are getting further away from the cursor;
   receiving a channel selection corresponding to a second program; and
   switching to a second stream in response to receiving the channel selection, wherein the dynamic power management switches the device to operate at the first power level after switching to the second stream.

2. The method of claim 1, wherein the second power level is a continuous mode.

3. The method of claim 1, further comprising:
   performing powergrouping on the plurality of streams.

4. The method of claim 1, further comprising:
   performing powergrouping on the at least one first stream.

5. The method of claim 1, further comprising:
   decoding the second stream and synchronizing the decoding with front-end processing.

6. The method of claim 1, further comprising:
   performing time slicing when operating at the first power level.

7. The method of claim 1, further comprising displaying a smaller version of a channel highlighted by the cursor in a preview pane of the selection panel.

8. The method of claim 1, further comprising while the selection panel is active, activating ones of the channels in a preference list according to priority, and leaving one or more channels open for the channels with icons that are closer to the cursor than other channels.

9. The method of claim 8, further comprising generating the preference list based on a user's watching habit.

10. The method of claim 8 further comprising granting higher priority to a radio frequency which carries most of the channels in the preference list.

11. The method of claim 8 further comprising deactivating unselected channels after channel selection is complete.

12. A mobile device configured to perform fast stream switching, the mobile device comprising:
   a receiver configured to receive a plurality of streams corresponding to a plurality of channels;
   a selection panel configured to receive a user input, the selection panel graphically illustrating the plurality of channels, the selection panel comprising a cursor;
   a multiprotocol encapsulation forward error correction module configured to determine the number of streams to be received by the receiver; and
   a power sequencing module configured to perform dynamic power management and adjust the power consumption of the mobile device based on the number of streams being received, the mobile device receiving the plurality of streams while the selection panel is active, wherein as the cursor moves, the mobile device activates ones of the channels with icons in the selection panel that are closer to the cursor and deactivates ones of the channels with icons in the selection panel that are getting further away from the cursor.

13. The mobile device of claim 12, further comprising:
   a multistream transport processor configured to perform powergrouping.

14. The mobile device of claim 13, further comprising:
   a front-end block configured to perform front-end processing; and
   a video decoder configured to perform video decoding, wherein the video decoder is configured to decode in parallel with and synchronize with the front-end processing.

15. The mobile device of claim 12, wherein the selection panel includes a preview pane that displays a smaller version of a channel highlighted by the cursor.

16. The mobile device of claim 12, wherein the mobile device is configured to activate, while the selection panel is activated, ones of the channels in a preference list according to priority, and leaving one or more channels open for the channels with icons that are closer to the cursor than other channels.

17. The mobile device of claim 16, wherein the mobile device is configured to generate the preference list based on a user's watching habit.

18. The mobile device of claim 16, wherein the mobile device is configured to grant higher priority to a radio frequency which carries most of the channels in the preference list.

19. The mobile device of claim 16, wherein the mobile device is configured to deactivate unselected channels after channel selection is complete.

20. A machine readable storage medium having a stored set of instructions executable by a device, the instructions, when executed are adapted to perform operations comprising:
   receive at least one first stream at the device corresponding to at least one first program, wherein the device employs dynamic power management and is operating at a first power level;
   activate a selection panel that graphically illustrates a plurality of channels, the selection panel comprising a cursor;
   while the selection panel is active, receive a plurality of streams corresponding to the plurality of channels;
   while the selection panel is active, operate in a second power level, wherein the second power level is a higher power level than the first power level in order to receive the plurality of streams;
   as the cursor moves, activate ones of the channels with icons in the selection panel that are closer to the cursor and deactivate ones of the channels with icons in the selection panel that are getting further away from the cursor;
   receive a channel selection corresponding to a second program; and
   switch to a second stream in response to receiving the channel selection, wherein the dynamic power management switches the device to operate at the first power level after switching to the second stream.

21. A computer-readable storage medium that stores:
   instructions executable by a processor to activate a selection panel that graphically illustrates a plurality of channels, the selection panel comprising a cursor;
   instructions executable by the processor to receive a plurality of streams corresponding to the plurality of channels while the selection panel is active;
   instructions executable by the processor to operate in a second power level while the selection panel is active;
   instructions executable by the processor to activate, as the cursor moves, ones of the channels with icons in the selection panel that are closer to the cursor and deactivating ones of the channels with icons in the selection panel that are getting further away from the cursor;
   instructions executable by the processor to receive a channel selection corresponding to a second program; and
   instructions executable by the processor to switch to a second stream in response to receiving the channel selection, wherein the dynamic power management switches the device to operate at the first power level after switching to the second stream.

22. The computer-readable storage medium of claim 21, wherein the second power level is a continuous mode.

23. The computer-readable storage medium of claim 21, further comprising:
   instructions executable by the processor to perform powergrouping on the plurality of streams.

24. The computer-readable storage medium of claim 21, further comprising:
   instructions executable by the processor to perform powergrouping on the at least one first stream.

25. The computer-readable storage medium of claim 21, further comprising:
   instructions executable by the processor to decode the second stream and synchronize the decoding with front-end processing.

26. The computer-readable storage medium of claim 21, further comprising:
instructions executable by the processor to perform time slicing when operating at the first power level.

27. The computer-readable storage medium of claim 21 further storing instructions executable by the processor to display a smaller version of a channel highlighted by the cursor in a preview pane of the selection panel.

28. The computer-readable storage medium of claim 21 further storing instructions executable by the processor to activate, while the selection panel is active, ones of the channels in a preference list according to priority, and leaving one or more channels open for the channels with icons that are closer to the cursor than other channels.

29. The computer-readable storage medium of claim 28 further storing instructions executable by the processor to generate the preference list based on a user's watching habit.

30. The computer-readable storage medium of claim 28 further storing instructions executable by the processor to grant higher priority to a radio frequency which carries most of the channels in the preference list.

31. The computer-readable storage medium of claim 28 further storing instructions executable by the processor to deactivate unselected channels after channel selection is complete.

32. A mobile device configured to perform fast stream switching, the mobile device comprising:
means for receiving at least one first stream at a device corresponding to at least one first program, wherein the device employs dynamic power management and is operating at a first power level;
means for activating a selection panel that graphically illustrates a plurality of channels, the selection panel comprising a cursor;
means for receiving, while the selection panel is active, a plurality of streams corresponding to the plurality of channels;
means for operation, while the selection panel is active, in a second power level, wherein the second power level is a higher power level than the first power level in order to receive the plurality of streams;
means for activating, as the cursor moves, ones of the channels with icons in the selection panel that are closer to the cursor and deactivating ones of the channels with icons in the selection panel that are getting further away from the cursor;
means for receiving a channel selection corresponding to a second program; and
means for switching to a second stream in response to receiving the channel selection, wherein the dynamic power management switches the device to operate at the first power level after switching to the second stream.

33. The mobile device of claim 32 comprising means for activating, while the selection panel is active, ones of the channels in a preference list according to priority, and leaving one or more channels open for the channels with icons that are closer to the cursor than other channels.

34. The mobile device of claim 33 comprising means for generating the preference list based on a user's watching habit.

* * * * *